United States Patent [19]
Nishida et al.

[11] Patent Number: 5,822,145
[45] Date of Patent: Oct. 13, 1998

[54] INFORMATION RECORDING AND/OR REPRODUCING APPARATUS USING AN INFORMATION RECORDING DEVICE HAVING TWO KINDS OF RECORDING MEDIA

[75] Inventors: Hideyuki Nishida, Yokohama; Tsunenori Yoshinari, Tokyo; Katsumi Arisaka, Kawasaki; Toshiaki Shingu, Kawasaki; Kazunori Masuda, Kawasaki, all of Japan

[73] Assignee: Canon Kabushiki Kaisha, Tokyo, Japan

[21] Appl. No.: 301,033

[22] Filed: Sep. 6, 1994

Related U.S. Application Data

[63] Continuation of Ser. No. 878,909, May 6, 1992, abandoned.

[30] Foreign Application Priority Data

| May 7, 1991 | [JP] | Japan | 3-101634 |
| Feb. 18, 1992 | [JP] | Japan | 4-030545 |

[51] Int. Cl.⁶ ............................................. G11B 15/18
[52] U.S. Cl. ........................ 360/69; 360/132; 360/133
[58] Field of Search ........................ 360/69, 132, 133, 360/134

[56] References Cited

U.S. PATENT DOCUMENTS

| 3,668,658 | 6/1972 | Flores et al. | 360/133 X |
| 4,338,644 | 7/1982 | Staar | 360/69 X |
| 4,408,335 | 10/1983 | d'Alayer de Costemore d'Arc et al. | 360/72.3 X |
| 4,814,924 | 3/1989 | Ozeki | 360/133 |
| 4,891,727 | 1/1990 | Sato et al. | 360/137 |
| 5,132,947 | 7/1992 | Kameda et al. | 369/32 |
| 5,159,182 | 10/1992 | Eisele | 360/132 X |
| 5,218,487 | 6/1993 | Richmond | 360/27 |

FOREIGN PATENT DOCUMENTS

| 476445 | 3/1992 | European Pat. Off. | 360/74.6 |
| 59-171010 | 9/1984 | Japan | 360/27 |

Primary Examiner—Andrew L. Sniezek
Attorney, Agent, or Firm—Fitzpatrick, Cella, Harper & Scinto

[57] ABSTRACT

An information recording device, which includes a case, a magnetic record carrier provided within the case, at least one semiconductor integrated circuit having at least one semiconductor memory provided within the case, and terminals for inputting and outputting data to and from the semiconductor memory or the semiconductor integrated circuit. Further, a recording and/or reproducing apparatus using the device, includes a detection circuit for detecting the mounting of the information recording device, and a switching circuit for switching the state of use of a memory in the apparatus in accordance with an output of the detection circuit.

21 Claims, 7 Drawing Sheets

INFORMATION RECORDING AND/OR REPRODUCING APPARATUS USING AN INFORMATION RECORDING DEVICE HAVING TWO KINDS OF RECORDING MEDIA

This application is a continuation of prior application, Ser. No. 07/878,909 filed May 6, 1992, now abandoned.

BACKGROUND OF THE INVENTION

1. Field of the Invention

This invention relates to a recording medium being contained within a magnetic record carrier, such as a magnetic tape cassette, a magnetic disc cassette or the like, and a recording and/or reproducing apparatus therefor.

2. Description of the Related Art

Large-storage-capacity magnetic tapes and magnetic disks (so-called floppy disks), having a smaller capacity than magnetic tapes have been used as magnetic recording media. These recording media are mainly used as secondary media for backup applications since they are inexpensive and have proven long shelf lives.

On the other hand, semiconductor memories have been used as primary media for applications in which high-speed operations are required, such as the processing of recording information, or the storage of CPU programs, for example.

An apparatus is configured so as to properly use the primary media and the secondary media. Usually, semiconductor memories, serving as the primary media, are located within the main body of a recording/reproducing apparatus. The magnetic recording media, serving as the secondary media, are mounted on a recording/reproducing apparatus from the outside.

In the above-described conventional approach, however, the Information access speed (in a tape medium, the time to move the tape to a recording/reproducing position, and in a disk medium, the seek time of a head to the position of a recording/reproducing sector) of magnetic recording media, serving as secondary media, is slow. The transfer rate (60 KBPS (kiloblts per second) for 3.5-inch floppy disks, and 180 KBPS for DATs (digital audio tape recorders)) of magnetic recording media is slower than that of semiconductor memories, serving as primary media.

Accordingly, in exchanging information with a magnetic recording medium, a recording/reproducing apparatus must always perform reading and writing operations after first inputting the information to a semiconductor memory (such an operation will be hereinafter termed a buffer memory operation). In order to perform such a buffer memory operation, a recording/reproducing apparatus must provide a memory with a sufficient storage capacity. However, the storage capacity of the memory is limited by its cost and its mounting operation.

SUMMARY OF THE INVENTION

The present invention has been made in consideration of the above-described problems.

It is an object of the present invention to provide an information recording medium and a recording and/or reproducing apparatus for a magnetic recording media, in which neither the processing nor the functions are limited by cost and mounting operations.

This object is accomplished, according to one aspect of the present invention, by an information recording device comprising a case, and a magnetic recording medium provided within the case. At least one semiconductor integrated circuit, comprising at least one semiconductor memory, is also provided within the case, and terminals for inputting and outputting data to and from at least one of the semiconductor memory and the semiconductor integrated circuit are provided at an outer surface of the case.

According to the above-described configuration, the magnetic recording medium and the semiconductor memory function as a secondary medium and a primary medium, respectively, when being mounted on a recording and/or reproducing apparatus.

According to another aspect, the present invention relates to a recording and/or reproducing apparatus for the information recording medium comprising detection means for detecting mounting of the information recording medium, and switching means for switching the state of use of a memory in the apparatus in accordance with an output of the detection means.

According to the above-described configuration, when the information recording medium has been mounted, the mounted state is detected and the state of use of a memory in the apparatus is switched.

According to still another aspect, the present invention relates to a recording/reproducing apparatus, comprising: a mounting member for selectively mounting one of different kinds of information recording media, a mounted information recording medium comprising at least one of a first memory, with a large storage capacity, and a second memory, with a small storage capacity. The apparatus also comprises detection means for detecting the kind of information recording medium mounted on the mounting member, and control means for controlling the apparatus to perform different operations in accordance with a detection output from the detection means.

The foregoing and other objects and features of the present invention will become more apparent from the following detailed description of the preferred embodiments taken in connection with the accompanying drawings.

DETAILED DESCRIPTION OF THE PREFERRED EMBODIMENTS

Preferred embodiments of the present invention will now be explained in detail. For the convenience of explanation, embodiments of an information recording device and an information recording/reproducing apparatus therefor will be explained concurrently.

Figure 1:
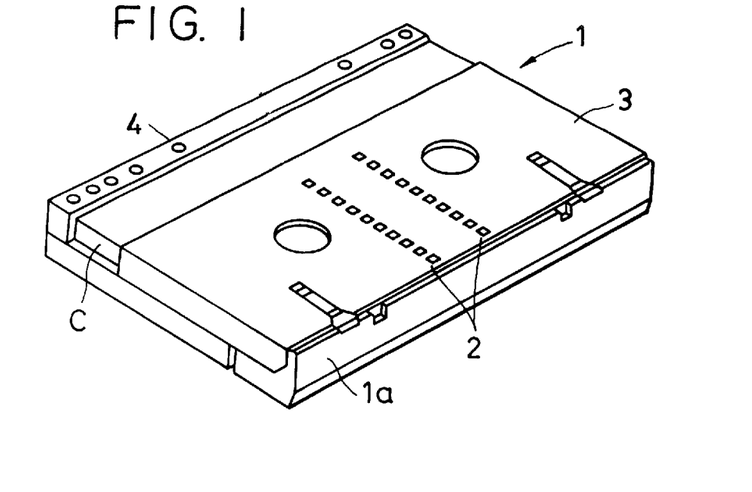
FIG. 1 is a perspective view of an information recording device according to an embodiment of the present invention.

FIG. 1 is a perspective view of an accommodating case (hereinafter termed a "cassette") of an information recording medium according to an embodiment of the present invention. In the present embodiment, the invention is applied to a magnetic tape cassette for a DAT (digital audiotape). While the access time of the magnetic tape is longer than that of a semiconductor memory (to be described later), the magnetic tape has a large storage capacity.

Figure 6:
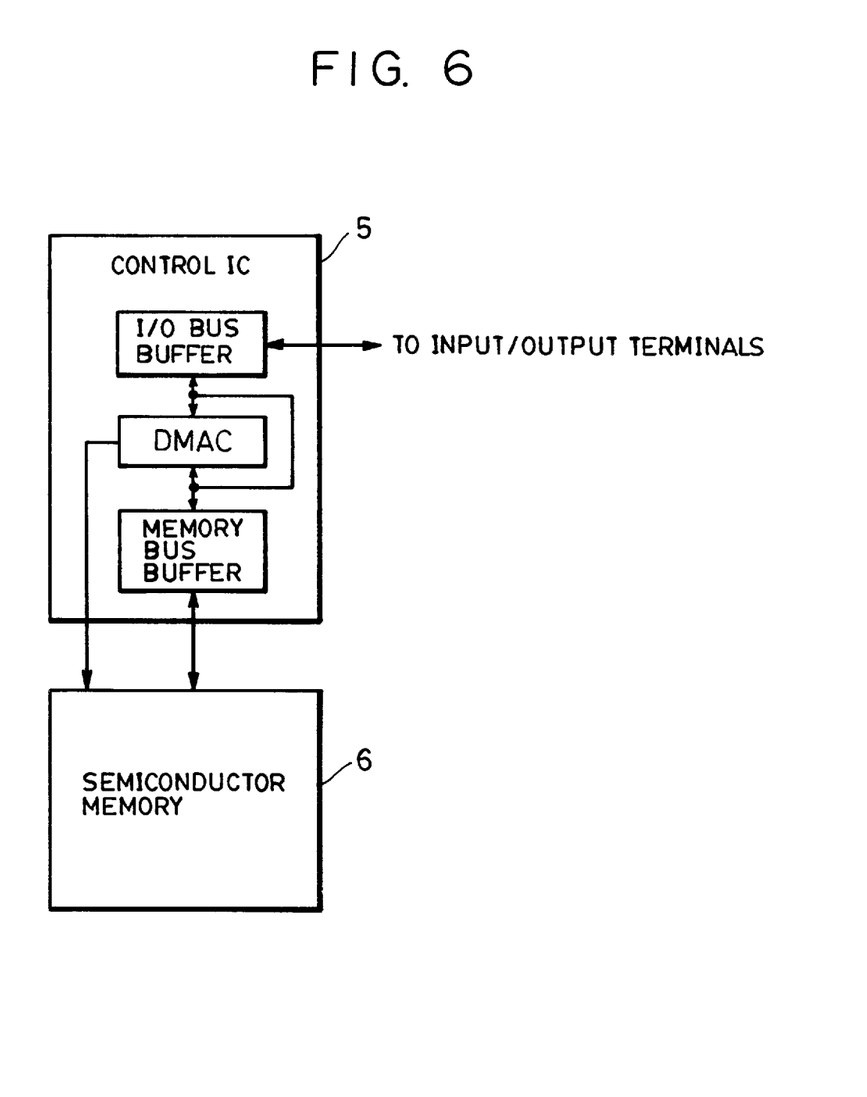
FIG. 6 is a block diagram of a control IC located in the information recording device shown in FIG. 1.

FIG. 6 is a block diagram of a recording/reproducing apparatus on which the above-described cassette is mounted. In the present embodiment, the invention is applied to a magnetic-tape recording/reproducing apparatus (a digital still-picture video camera). By using the above-described cassette in this apparatus, it becomes possible to perform new processing and provide new functions.

Figure 2A:
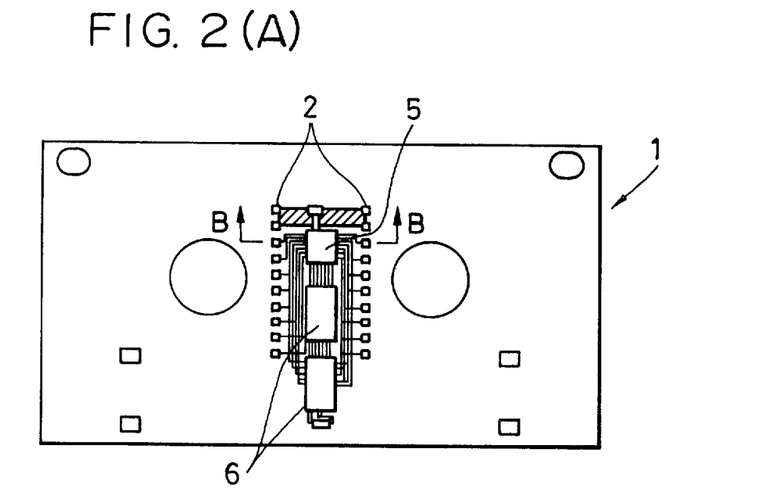
FIG. 2(A) is a diagram showing the internal structure of the information recording device, as seen from the bottom.
Figure 2B:
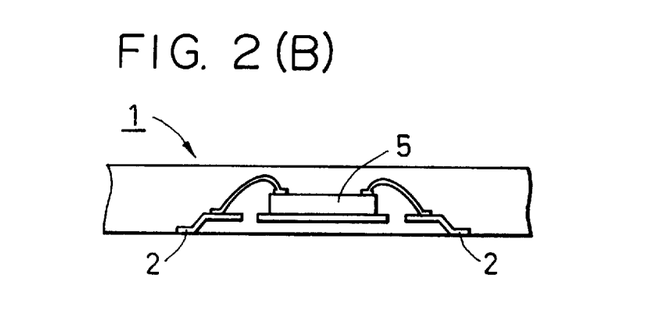
FIG. 2(B) is a cross-sectional view of the information recording device taken along line B—B shown in FIG. 2(A)
Figure 3:
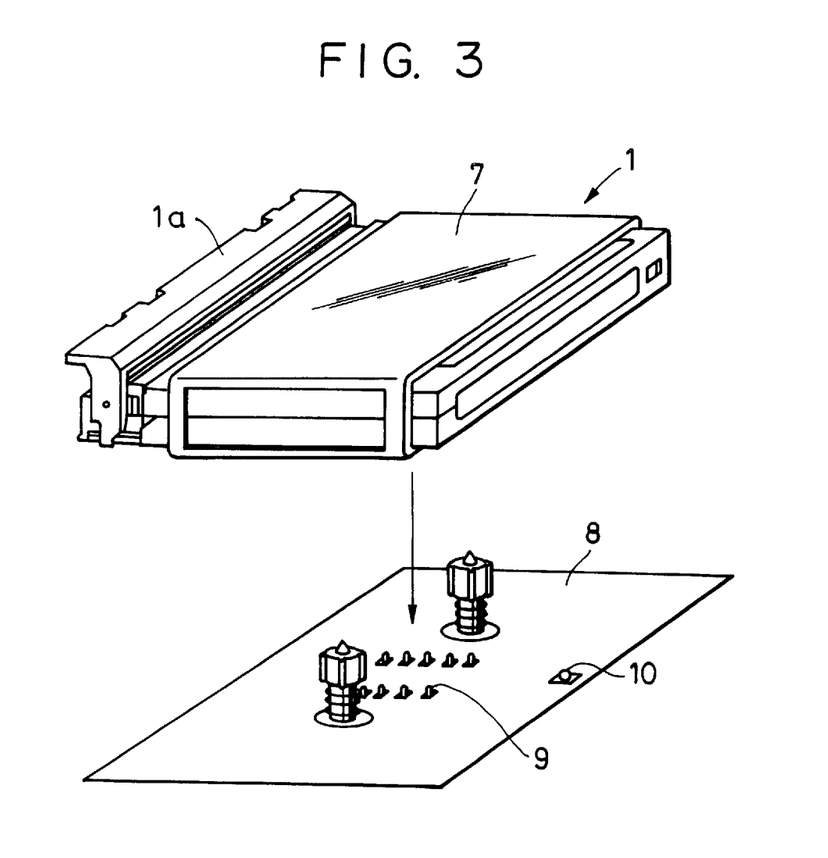
FIG. 3 is a perspective view showing a state of mounting the information recording device shown in FIG. 1, on a recording/reproducing apparatus.
Figure 4:
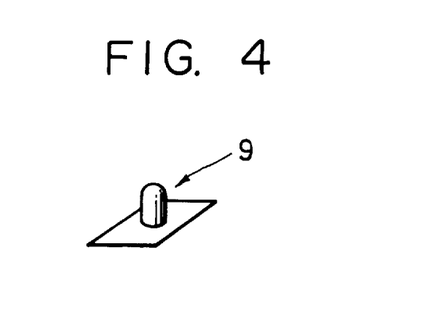
FIG. 4 is an enlarged perspective view of an input/output terminal of FIG. 3.

FIG. 2(A) is a diagram showing the internal structure of the cassette shown in FIG. 1, as seen from the bottom. FIG. 2(B) is a cross-sectional view of the cassette taken along line B—B shown in FIG. 2(A). FIG. 3 is a diagram showing a state of mounting the cassette on the recording/reproducing apparatus. FIG. 4 is a perspective view of an input/output terminal 9 shown in FIG. 3.

In FIGS. 1 through 6, a cassette 1 accommodates a magnetic tape used in a recording/reproducing apparatus usually called a DAT (digital audio tape), and it also incorporates semiconductor memories 6 and a control IC 5. The control IC 5 is shown in FIG. 6. Each of the semiconductor memories 6 has a memory storage capacity large enough to store at least the image data for one frame. The control IC 5 has an input/output I/O bus buffer connected to input/output terminals, which are connected to an address bus, a data bus, and the control bus of the main body of the recording/reproducing apparatus.

Terminals 2 are used to input and output data from the semiconductor memories 6 and the control IC 5 to and from a recording/reproducing apparatus 8 in a state when the cassette 1 is mounted on the apparatus 8. A slider 3 locks a front cover 1a of the cassette 1. The cassette 1 also provides an indicating hole 4, which indicates that the cassette 1 is a normal cassette.

The control IC 5 integrates control circuitry for controlling the writing and reading of information in and from the semiconductor memories 6. The semiconductor memory 6 operates as an extended memory of the recording/reproducing apparatus 8 when the cassette 1 is loaded in the apparatus 8, and comprises a RAM (random access memory), a ROM (readonly memory), an $E^2PROM$ (electrically erasable programmable read-only memory), or the like. There is also shown a cassette holder 7 provided in the apparatus 8.

Next, an explanation will be provided of the recording/reproducing apparatus 8. In FIG. 6, reference numeral 9 represents input/output terminals of the apparatus connected to the input/output terminals 2 (see FIG. 1) when the loading operation is completed. In FIG. 4, the terminals 9 are upwardly driven by a spring (not shown) so as to securely contact the terminals 2 when the cassette 1 is mounted. A detection switch 10 (see FIG. 3) detects the indicating hole 4 (see FIG. 1) when the cassette 1 has been mounted. There are also shown a magnetic tape 11, serving as the magnetic record carrier, and a rotating drum 12 including recording and reproducing heads for recording on and reproducing from the magnetic tape 11.

A servo circuit 13 controls respective motor drivers of the recording/reproducing apparatus 8. A detection means 14 detects a signal from the detection switch 10, and notifies a microcomputer 22a, provided in a system control unit 22, that the semiconductor memory 6 has been incorporated. The detection means 14 may share a control bus for the microcomputer 22a. An image data input means 15 includes, for example, an image pickup device, such as a CCD (charge-coupled device) or the like. A signal processing circuit 16 performs, for example, compression/expansion for recording a signal from the image data input means 15 or an image memory card 18 mounted from the outside (in some cases incorporated in the apparatus). A signal processing circuit 17 records and reproduces image data on and from the magnetic tape 11. The image memory card 18 serves as a recording medium for the apparatus, which is the digital still-picture video camera. A display-signal processing circuit 19 displays on a display unit 20, which comprises, for example, a liquid-crystal display. An operation panel 21 operates the recording/reproducing apparatus 8. The system control unit 22 incorporates the microcomputer 22a, and controls the system comprising the above-described respective units.

An explanation will now be provided of the operation of the above-described configuration.

Figure 7:
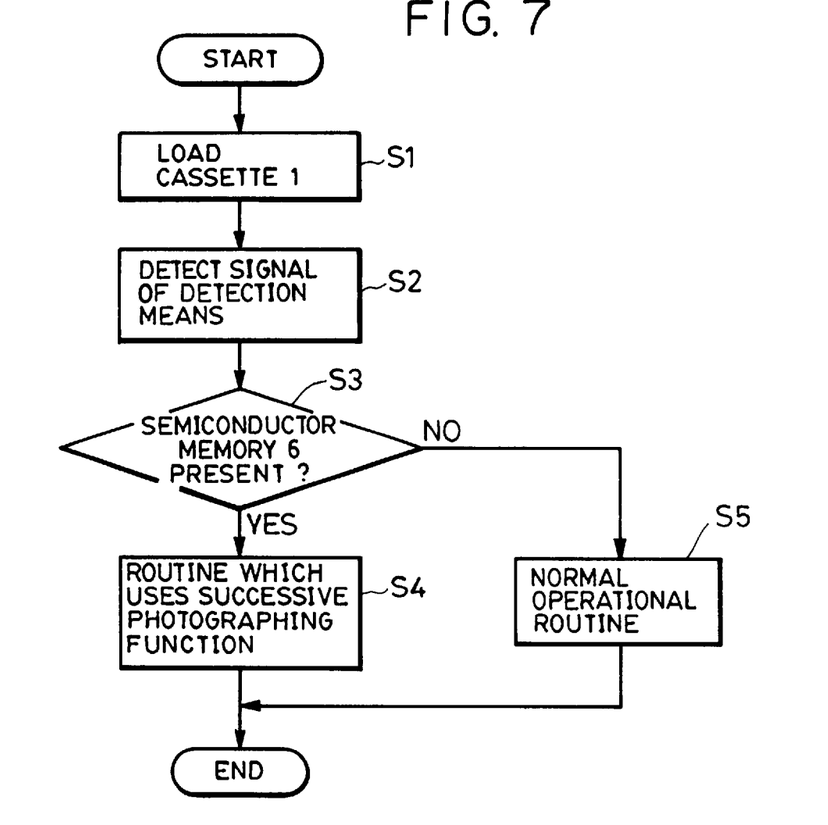
FIG. 7 is a flowchart showing an operation of the recording/reproducing apparatus shown in FIG. 5.

As shown in the flowchart of FIG. 7, first in step 1 (hereinafter indicated as S1), the cassette 1 is loaded in the recording/reproducing apparatus 8, whereby the detection switch 10 provided in the recording/reproducing apparatus 8 detects the indicating hole 4 and transmits a detection signal to the detection means 14 of the apparatus 8. In a step S2, the microcomputer 22a, provided in the system control unit 22, detects a signal from the detection means 14. In step S3, the microcomputer 22a determines whether or not the semiconductor memory 6 is present.

If the cassette 1 incorporates the semiconductor memory 6, the buffer memory operation as the extended-memory function is performed. Since the apparatus is a digital still-picture video camera, the process enters, for example, the sequence of performing a successive photographing operation, wherein image data for a few frames are stored in the incorporated semiconductor memory 6, as shown in FIG. 6. The successively photographed image data are recorded on the magnetic tape 11 via the signal processing circuit 16 and the recording/reproducing signal processing circuit 17 during intervals of the successive photographing operation using a DMAC (direct memory access controller) located within the incorporated control IC 5 (S4).

If the cassette 1 incorporates only the magnetic tape 11, the process enters a normal routine wherein, when the image memory card 18 has recorded image data for an assigned number of frames, the data are downloaded onto the magnetic tape 11, and subsequently the next image data are recorded (S5).

Figure 5:
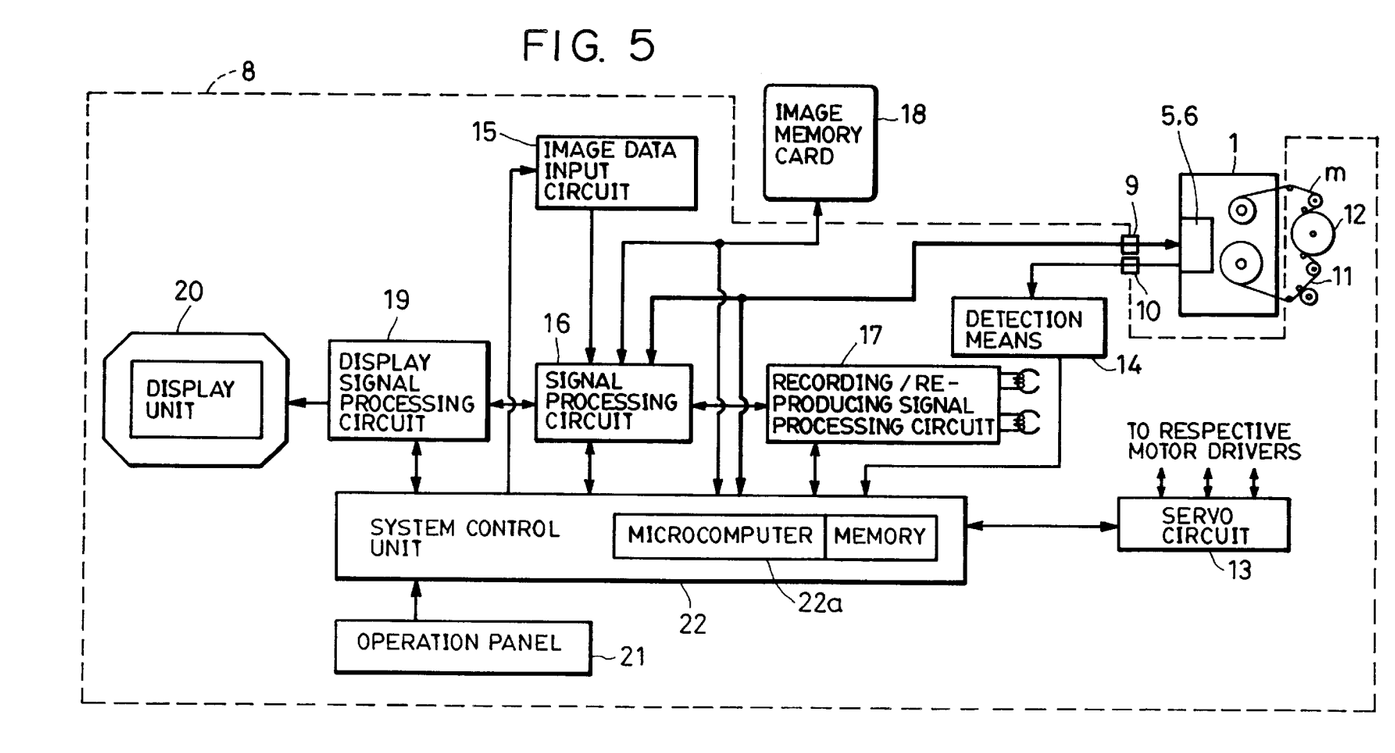
FIG. 5 is a block diagram showing the electrical configuration of the recording/reproducing apparatus shown in FIG. 3.

Processing of image data after the successive photographing operation is performed via the DMAC function of the control IC 5 through a bus indicated by thick lines in FIG. 5. Hence, the microcomputer 22a can store image data in the image memory card 18 even while the preceding image data are recorded on the magnetic tape 11. Accordingly, a shutter opportunity will not be lost while data are recorded on the magnetic tape 11.

Although not illustrated, in FIG. 2, if one of the semiconductor memories 6 comprises a ROM which stores the operation program of the extended function, the storage capacity reserved for the program in the ROM incorporated in the microcomputer 22a of the recording-reproducing apparatus 8 can be allocated to other processing functions of the apparatus, and the function of the apparatus can thereby be increased. The ways of utilizing the semiconductor memories 6 are not limited to the above-described ones, but the semiconductor memories 6 may, of course, be utilized for various kinds of signal processing and the like. The semiconductor memory 6 may only have a storage capacity for 1 H (horizontal scanning line). The storage capacity of the semiconductor memory 6 may be set in accordance with the method of utilization.

Figure 8:
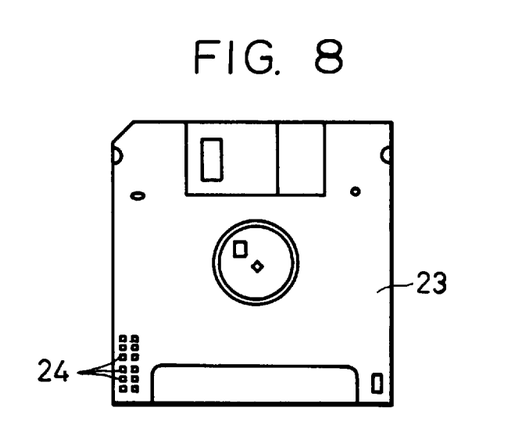
FIG. 8 is a bottom plan view of an information recording device according to another embodiment of the present invention.

FIG. 8 is a plan view of an information recording device according to another embodiment of the present invention. In the present embodiment, the invention is applied to a 3.5-inch floppy disk. In FIG. 8, there are shown a floppy-disk case 23, and input-output terminals 24 for semiconductor memories. A control IC is also incorporated within the floppy-disk case 23.

According to the above-described configuration, if, for example, the information recording medium of the present embodiment is used for a notebook-size personal computer, high-speed processing can be performed by using the incorporated semiconductor memory as a RAM disk. Hence, even in notebook-size personal computers, for which reduction in size is required, it is possible to reduce any limitation in mounting.

Although, in the above-described embodiments, an explanation has been provided of the cases wherein the invention is applied to a DAT (digital audio tape) cassette and a floppy disk, the present invention is not limited to such cases. By applying the invention to an 8-mm-VCR (video cassette recorder) cassette, a VHS cassette, a β-movie cassette, a μ-DAT cassette, a DCC (digital compact cassette) or the like, it is possible to increase the function of an apparatus or a system which uses such a cassette.

Figure 9A:
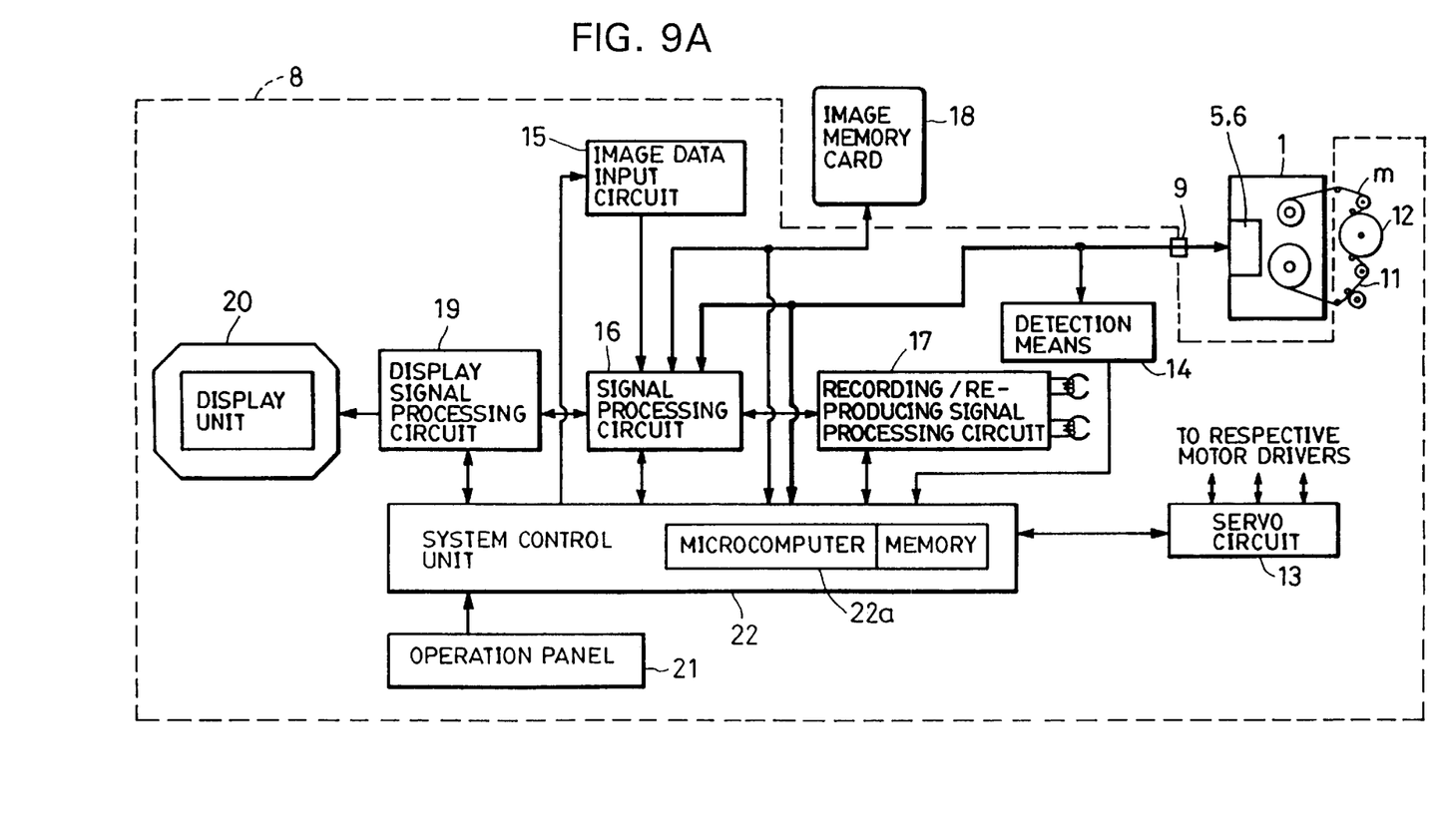
FIGS. 9A and 9B are block diagrams showing the electrical configuration of alternate embodiments of the recording/reproducing apparatus of the present invention.
Figure 9B:
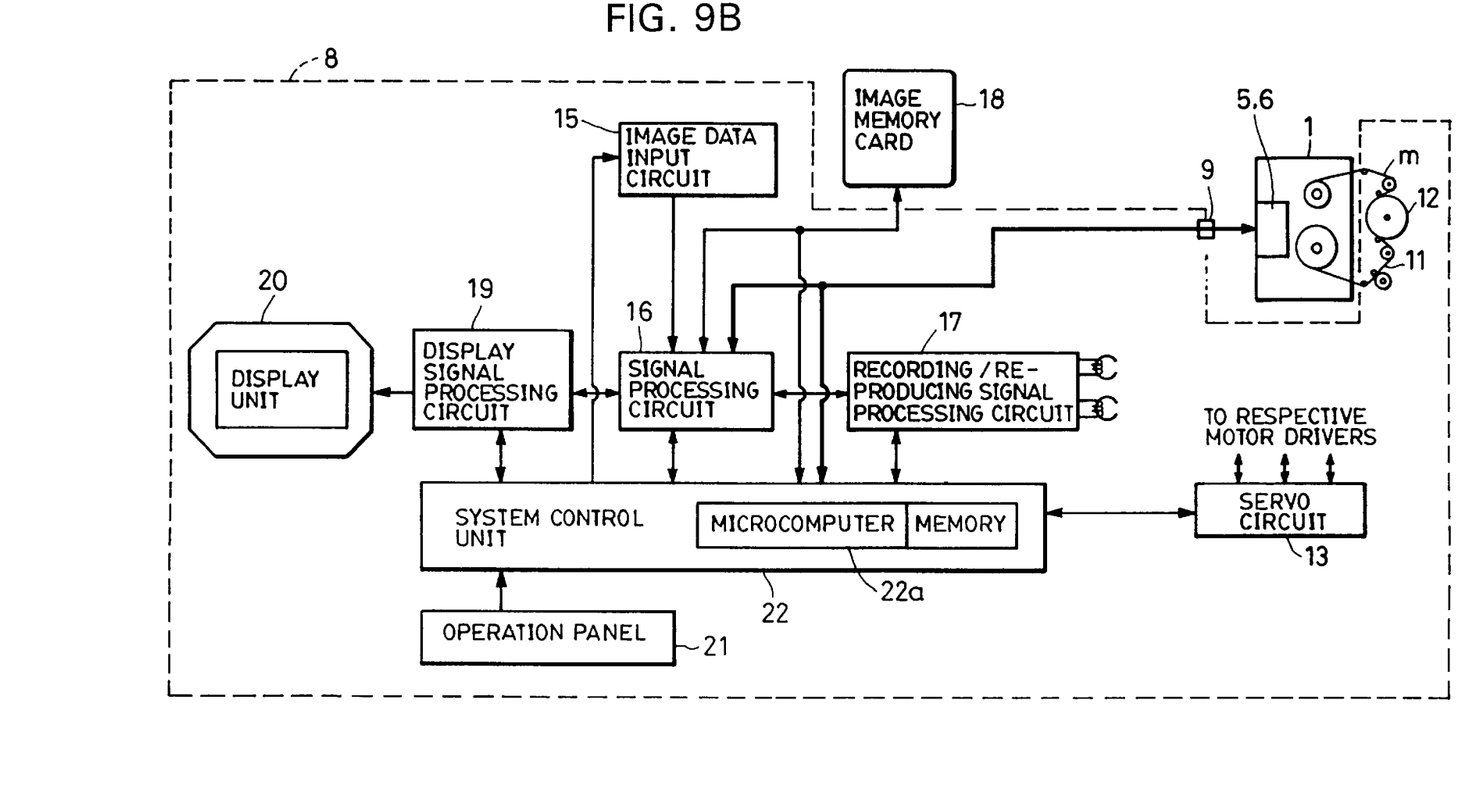

As for the detection means, in addition to a method of providing a detection hole in the cassette and detecting the hole by a mechanical means, as described in the above-described embodiment, a method of attaching a reflecting seal at a predetermined position of the cassette and detecting the seal by an optical means, and a method of generating a detection signal using one of the input/output terminals (through which, as discussed above, data is passed between the semiconductor memories 6 and the recording/reproducing apparatus 8) and detecting the "H" (1) and "L" (0) of a corresponding bit on the control bus may also be used, as in the embodiment shown in FIG. 9A. Of course, as will be appreciated by those skilled in the art, the microcomputer 22a can receive the detection signal directly, as shown in FIG. 9B.

Although the apparatus of the above-described embodiment can perform both recording and reproducing operations, the present invention is not limited to such an apparatus, but may also be applied to an apparatus dedicated for a recording operation, and an apparatus dedicated for a reproducing operation.

As explained above, the information recording device of the present invention is compatible with a corresponding conventional magnetic recording medium. At the same times if the information recording medium is used in the recording and/or reproducing apparatus of the present invention, the built-in semiconductor memory functions as an extended memory for the memory in the apparatus, whereby the ability of the apparatus can be increased.

In the above-described embodiments, since a magnetic record carrier and semiconductor memory devices are provided within a case, and terminals for inputting and outputting data to and from the semiconductor memory devices are provided at an outer surface of the case, the semiconductor memory devices can be accessed before data can be recorded in and reproduced from the magnetic record carrier. Furthermore, by recording indices and identifying information in incorporated in semiconductor memory devices, it is possible to know the contents of data stored on a magnetic tape at an early stage.

Except as otherwise disclosed herein, the various components shown in outline or in block form in FIGS. 5 and 6 are individually well-known and their internal construction and operation is not critical either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretations so as to encompass all such modifications and equivalent structures and functions.

What is claimed is:

1. An apparatus for performing at least one of recording and reproducing information, comprising:

a mounting member for selectively mounting one of a plurality of kinds of information storage devices, including a first kind of information storage device, comprising a first type of medium having a first storage capacity and access time, and a second kind of information storage device, comprising the first type of medium and a second type of medium having a second storage capacity and access time, different from those of the first type;

a terminal;

reading means for reading data from the second type of medium through said terminal;

detection means for receiving a detection signal through said terminal to detect the kind of the information storage device mounted on said mounting member and for producing a detection output indicative of the kind of information storage device mounted on said mounting member; and control means for controlling the apparatus to perform at least one of different recording functions and different reproducing functions in accordance with the detection output from said detection means.

2. An apparatus according to claim 1, wherein said first type of medium comprises a magnetic recording medium.

3. An apparatus according to claim 1, wherein said second type of medium comprises at least one semiconductor memory.

4. An apparatus according to claim 1, wherein said first type of medium has a longer access time than that of said second type of medium.

5. An apparatus according to claim 1, wherein said control means performs a signal processing operation which utilizes the second type of medium when said detection means detects that an information recording medium comprising the first type of medium and the second type of medium is mounted.

6. The apparatus of claim 1, further comprising a medium information memory for storing information related to the mounted recording medium, and switching means for switching information stored in said medium information memory, the information being switched in accordance with the detection output of said detection means.

7. An apparatus according to claim 1, further comprising recording means for recording an information signal on the information storage device mounted on said mounting member.

8. An apparatus according to claim 7, wherein the information signal includes an image signal.

9. An apparatus according to claim 8, further comprising image input means for generating the image signal.

10. An apparatus according to claim 9, wherein said image input means comprises an imaging device.

11. An apparatus according to claim 8, wherein the first type of medium includes a tape-shaped recording medium, and wherein said recording means comprises a head for recording the image signal on the tape-shaped recording medium.

12. An apparatus according to claim 1, wherein the first type of medium includes a disk-shaped recording medium.

13. An apparatus for performing at least one of recording and reproducing information, comprising:
   a mounting member for selectively mounting one of a first kind of information recording device and a second kind of information recording device, wherein the first kind of information recording device includes only a first type of recording medium and the second kind of information recording device includes both the first type of recording medium and a second type of recording medium having an access time shorter than that of the first type of recording medium;
   a terminal;
   reading means for reading data from the second type of recording medium through said terminal;
   detection means for receiving a detection signal through said terminal to discriminate which kind of recording device is mounted on said mounting member and for outputting a detection output indicative of the kind of recording device mounted on said mounting member; and
   control means for controlling said apparatus to perform a first set of operations when the detection output indicates that the first kind of recording device is mounted and to perform operations in addition to the first set of operations when the detection output indicates that the second kind of recording device is mounted.

14. An apparatus according to claim 13, wherein said control means comprises means for utilizing the second kind of recording device as an extended memory when the detection signal indicates that the second kind of recording device is mounted.

15. An apparatus according to claim 13, wherein said control means comprises means for utilizing the second kind of recording device as an operating program source to perform at least some of the additional functions when the detection signal indicates that the second kind of recording device is mounted.

16. A data processing apparatus to which a first cassette having a magnetic tape and a second cassette having a magnetic tape and a semiconductor memory are selectively set, said apparatus comprising:
   a terminal;
   reading means for reading data from the semiconductor memory of the second cassette through said terminal; and
   discrimination means for receiving a detection signal through said terminal to discriminate which cassette is set to the apparatus.

17. An apparatus according to claim 16, further comprising recording means for recording an image signal to the magnetic tape by using a rotary head.

18. An apparatus according to claim 17, wherein said recording means comprises compressing means for compressing an information amount of the image signal.

19. An apparatus according to claim 16, further comprising reproducing means for reproducing an image signal from the magnetic tape by using a rotary head.

20. A data processing apparatus to which a first cassette having a magnetic tape and a second cassette having a magnetic tape and a semiconductor memory are selectively set, said apparatus comprising:
   a terminal; and
   a microcomputer for reading data from the semiconductor memory of the second cassette through said terminal and for receiving a detection signal through said terminal to discriminate which cassette is set to the apparatus.

21. An apparatus according to claim 20, wherein said microcomputer controls operation of said apparatus according to the result of the discrimination.

* * * * *

UNITED STATES PATENT AND TRADEMARK OFFICE
CERTIFICATE OF CORRECTION

PATENT NO. : 5,822,145

DATED : October 13, 1998

INVENTOR(S) : HIDEYUKI NISHIDA, ET AL.

It is certified that error appears in the above-identified patent and that said Letters Patent is hereby corrected as shown below:

COLUMN 1,
Line 36, "Information" should read --information--; and
Line 62, "media," should read --medium--.

COLUMN 3,
Line 17, "FIG. 6" should read --FIG. 5--; and
Line 55, "(readonly" should read --(read-only--.

Signed and Sealed this

Fourth Day of May, 1999

Q. TODD DICKINSON

Attest:

Attesting Officer      Acting Commissioner of Patents and Trademarks